United States Patent
Walters et al.

[11] Patent Number: 6,162,282
[45] Date of Patent: Dec. 19, 2000

[54] METHOD FOR DETERMINING HYDROCARBON SATURATION OF CARBON FILTERS IN A GAS TREATMENT PROCESS

[75] Inventors: Clifford C. Walters, Lucas; Constance L. Hellyer, Richardson, both of Tex.

[73] Assignee: Mobil Oil Corporation, Fairfax, Va.

[21] Appl. No.: 09/307,965

[22] Filed: May 10, 1999

[51] Int. Cl.[7] .............................. B01D 53/14; B01D 15/08
[52] U.S. Cl. ................................ 95/82; 95/87; 95/173; 95/179; 95/181; 95/183; 95/235; 95/236
[58] Field of Search ................................ 95/82, 157, 173, 95/179, 181, 183, 235, 236

[56] References Cited

U.S. PATENT DOCUMENTS

| | | |
|---|---|---|
| 3,284,162 | 11/1966 | Deal et al. . |
| 3,347,621 | 10/1967 | Papadopoulos et al. . |
| 3,352,631 | 11/1967 | Zarker . |
| 3,376,356 | 4/1968 | Freitas et al. . |
| 3,463,603 | 8/1969 | Freitas et al. . |
| 4,530,827 | 7/1985 | Heisel et al. ........................... 95/235 X |
| 4,545,965 | 10/1985 | Gazzi et al. ........................... 95/235 X |
| 4,714,480 | 12/1987 | Wansink ................................. 95/181 X |
| 5,683,491 | 11/1997 | Gelsinger ................................... 95/82 |
| 5,716,525 | 2/1998 | Nickerson ............................... 95/82 X |
| 5,820,837 | 10/1998 | Marjanovich et al. ............... 95/173 X |

*Primary Examiner*—Robert H. Spitzer

[57] ABSTRACT

A method for determining the efficiency of a carbon filter used to absorb hydrocarbons from organic solvents. A sample of the solution, used to remove $CO_2$ and $H_2S$ from natural hydrocarbon gases, is taken after it has passed through the carbon filter. A solution of an internal standard and carbon disulfide is added to the sample to concentrate the hydrocarbons into the solution. A second sample taken from the solution containing the concentrated hydrocarbons and is passed through a gas chromatograph which has a fast temperature ramp to measure the peak areas of the hydrocarbons and the internal standard. The concentration of the measured hydrocarbons are determined by comparing the peak area counts against that of the internal standard.

14 Claims, 2 Drawing Sheets

6,162,282

METHOD FOR DETERMINING HYDROCARBON SATURATION OF CARBON FILTERS IN A GAS TREATMENT PROCESS

DESCRIPTION

1. Technical Field

The present invention relates to a method for determining the hydrocarbon saturation of carbon filters in a gas treatment process and in one of its aspects relates to a method whereby the hydrocarbon content of a regenerated solvent used in extracting acid gases from a hydrocarbon gas stream is measured by an expedient gas chromatography technique after said solvent has passed through a carbon filter to thereby determine the absorption efficiency of the filters at any given time.

2. Background

It is well known that many hydrocarbon gas streams (i.e., "sour gas") produced from certain subsurface formations contain substantial volumes of "acid gases" (e.g., hydrogen sulfide, carbon dioxide, and the like) that must be substantially removed from the gas before it can be passed on to market. One known process for treating a "sour gas" stream involves passing the gas stream through a contactor vessel containing an aqueous mixture of organic solvents (e.g., such as methyldiethanolamine [MDEA], Tetrahydrothiophene-1,1-dioxide [Sulfolane], and other additives). The solvents have the capacity to absorb the acid gases and carry them out of the gas stream. After the acid gases have been removed or reduced to acceptable levels by the solvent, the treated hydrocarbon gas stream is passed on for use or to market.

The "rich" solvent (i.e. the solvent plus the acid gases) passes from the contactor vessel to a regenerator vessel where the acid gases are separated from the solvent. The separated acid gases are then passed on for further processing while the regenerated solvent is recycled for use in the solvent contactor vessel.

Unfortunately, as the organic solvents absorb the acid gases from the gas stream, they also solubilize and pick up small amounts of the liquid hydrocarbons from the stream. When the "rich solvent" is regenerated a substantial amount of these solubilized hydrocarbons remain in the solvent. A build up of hydrocarbons in the recycled solvent has several negative effects on the gas treating process. For example, increased hydrocarbons in the recycled solvent can cause an increase in the liquid hydrocarbon concentration of the acid gases, which then pass from the solvent regenerator to a Sulfur Recovery Unit (SRU), thereby reducing the efficiency of converting the hydrogen sulfide ($H_2S$) in the acid gas to sulfur. Another potential problem is that hydrocarbon buildup in the recycled solvent can increase the probability of foaming in the primary amine absorption process (i.e. in the contactor vessel) which can lead to excess slugging of acid gases to the SRU and reduced absorption capacity of the solvent itself. Acid gas slugging, in turn, increases sulfur dioxide emissions from the process, while the reduced absorption capacity will cause reduced gas production and gas sales quality, and/or cause the overall gas treatment process to "sour up".

One known technique for reducing or delaying the buildup of hydrocarbons in the recycled solvent is to pass a portion (i.e. slip stream) of the regenerated solvent through a carbon filter(s) before it is returned to the contactor vessel. The carbon filter(s) absorbs the liquid hydrocarbons from the slip stream of the recycled solvent with the filtered solvent then being recombined with the main stream of recycled solvent before the regenerated solvent passes back through the contactor. By treating only a portion of the regenerated solvent, the hydrocarbon contamination can be kept at manageable levels, thereby alleviating substantially the negative side-effects caused by the remaining hydrocarbons dissolved or suspended in the regenerated solvent.

As with all filters, the carbon will eventually become loaded (i.e. saturated) to a point where its effectiveness in controlling the hydrocarbon buildup in the solvent is lost. If the carbon is not replaced before it becomes saturated, the hydrocarbons in the regenerated solvent will not be removed by the filter but will pass through, thereby resulting in the negative side-effects (e.g. foaming in the contactor) discussed above.

In most systems of this type, there are no reliable methods for measuring the hydrocarbon loading (i.e. saturation) on the carbon filter(s) on a prescribed basis (e.g., daily) whereby the filter(s) can be monitored and changed before the hydrocarbon saturation exceeds the effective capacity of the filter. The condition of the filter(s) is monitored loosely by measuring the differential pressure across the filter. An increase in differential pressure will occur when the flow through the filter becomes partially restricted, thereby indicating that the absorption capacity of the filter has been reached. The carbon is then changed, but by this time it may be too late to prevent foaming in the contactor or decreased efficiency in a Sulfur Recovery Unit (SRU). Corrective actions may require shutting in the process and replacement of the organic solvent. A shut down to correct the resulting side-effects seriously affects the overall economics of the treating process.

Recently, a method has been proposed for determining the saturation of such carbon filters by taking a sample of the regenerated solvent after it has passed through the filters. This sample is then passed through a gas chromatograph to determine the amount of hydrocarbons which still remain in the solvent after the solvent has passed through the filters, see U.S. Pat. No. 5,683,491, issued Nov. 4, 1997, and incorporated herein by reference. In this method, no internal standards are added to the sample nor is it necessary to weigh the sample before it is passed through the gas chromograph.

While methods such as that referred to above have been proposed for monitoring the hydrocarbon saturation of the carbon filters, there is still a need to other methods for measuring the effectiveness of the carbon filters at any time during the gas treatment process so that the carbon can be changed before the buildup of hydrocarbons in the regenerated solvent produces foaming in the contactor.

SUMMARY OF THE INVENTION

The present invention provides a method for treating a sour hydrocarbon gas stream to remove acid gases (e.g., $H_2S$ and/or $CO_2$.) from said gas stream by contacting said stream with an aqueous solution of organic solvents (e.g., "Sulfinol-M" which is comprised of Sulfolane (Tetrahydrothiophene-1,1-dioxide) and MDEA (methyldiethanlamine)). The "rich" solvent is regenerated by removing the acid gases and is then recycled for further use in removing acid gases from the sour gas stream. As the regenerated solvent is recycled, at least a portion of the regenerated solvent (i.e. a side stream) is passed through a carbon filter(s) to remove those hydrocarbons that have been absorbed from the sour gas stream into the solvent along with the acid gases.

In carrying out the present invention, a method is provided for determining, at any given time, the absorption efficiency of the carbon filter (i.e. the ability of the carbon to absorb the hydrocarbons from the regenerated solvent). That is, the saturation of the carbon filter can be determined at any given time. Basically, this is done by taking a sample of said regenerated solvent after it has passed through said carbon filter, perform a liquid—liquid extraction to enrich the dissolved and entrained hydrocarbons, and analyzing the extract using a fast gas chromatographic method. The concentration of the hydrocarbons in the regenerated solvent is determined by comparing the measured area counts against an internal standard and applying an appropriate response factor. The amounts of the individual hydrocarbon components are then added to produce the total amount of hydrocarbon that is present in said regenerated solvent after it has passed through said carbon filter.

By taking samples of the filtered, regenerated solvent at regular intervals (e.g., daily), the actual saturation of the filter can be readily monitored. When the total amount of hydrocarbons in the filtered solvent approaches an unacceptable level (e.g. 1.5%. by volume), the filter will have lost its ability to remove sufficient hydrocarbons from the regenerated solvent. The carbon can then be replaced before the contaminated solvent can cause any of the adverse side-effects normally associated therewith.

More specifically, in carrying out the present method, the procedure is initially tested with a suite of standard mixes prepared by adding pure hydrocarbons of known concentration to the organic solvent that is used in the gas treatment. The organic solvent may be either the commercial product (if known to be free of hydrocarbons) or a synthetic blend prepared from reagents of known purity. A stock solution used for extraction of hydrocarbons from the organic solvent is prepared by dissolving one gram of trans-2-heptene in one Liter of carbon disulfide ($CS_2$). Known weights or volumes of each hydrocarbon standard mixture are added to a known volume of the "spiked" carbon disulfide contained in a gas chromatograph autosampler vial. The dissolved or entrained hydrocarbons will partition from the gas treatment solvent into the $CS_2$ using mechanical agitation. A bilayer will form with the $CS_2$ condensing on the bottom. Proper positioning of the autosampler needle will allow for the transfer of a fixed volume of the $CS_2$ layer to the gas chromatograph (GC) inlet without additional steps to remove the aqueous solution of organic solvents used in the gas treatment.

The gas chromatographic method uses a fast temperature ramp. This allows for the complete hydrocarbon analysis from $C_6$ to >$C_{15}$ in under six minutes. The rapidity of the analysis allows for replicate runs and frequent calibrations with little impact on total analytical time. Peak areas of individual hydrocarbons and internal standard are measured using an automated data processing procedure. Response factors for individual hydrocarbons are set to equal the response factor for the internal standard. Calculated hydrocarbon measurements on the suite of standard mixes validates the method and provides the basis for knowing the accuracy of the technique. If increased accuracy is required response factors can be determined for the individual hydrocarbons by comparing ratio of its peak area to that of the internal standard and calculating the value needed to correspond to the known concentration. These response factors reflect the accumulated affects of partitioning, volatilization, and detector response.

Once standard mixtures are properly measured, the same extraction processes and fast gas chromatographic method can be applied to regenerated solvent from the gas treatment slip stream. A small sample is collected down stream of the carbon filter(s). A known volume or weight of the regenerated solvent is added to a pre-measured volume of CS2 spiked with the internal standard. After extraction of the hydrocarbons from the regenerated solvent into the $CS_2$, the $CS_2$ layer is analyzed using the fast gas chromatographic method. The concentrations of individual hydrocarbons are determined in the regenerated solvent by application of the appropriate response factor to the ratio of its peak area and to that of the internal standard. By this procedure, the saturation of the carbon filters can be monitored at any time during the gas treatment process. An increase in the concentration of dissolved or entrained hydrocarbons above normal operating conditions will indicate that the carbon filters should be changed before they are totally saturated and failure of the gas treatment process ensues.

The gas chromatography method of the present invention differs from known GC methods in that sample preparation is performed within the autosampler vial, it is rapid and easily permits replicate analyses, and is highly automated and can be performed by technicians with minimal effort and training.

BRIEF DESCRIPTION OF THE DRAWINGS

The actual construction, operation, and apparent advantages of the present invention will be better understood by referring to the drawings which are not necessarily to scale and in which like numerals identify like parts and in which.

BEST KNOWN MODE FOR CARRYING OUT THE INVENTION

Figure 1:
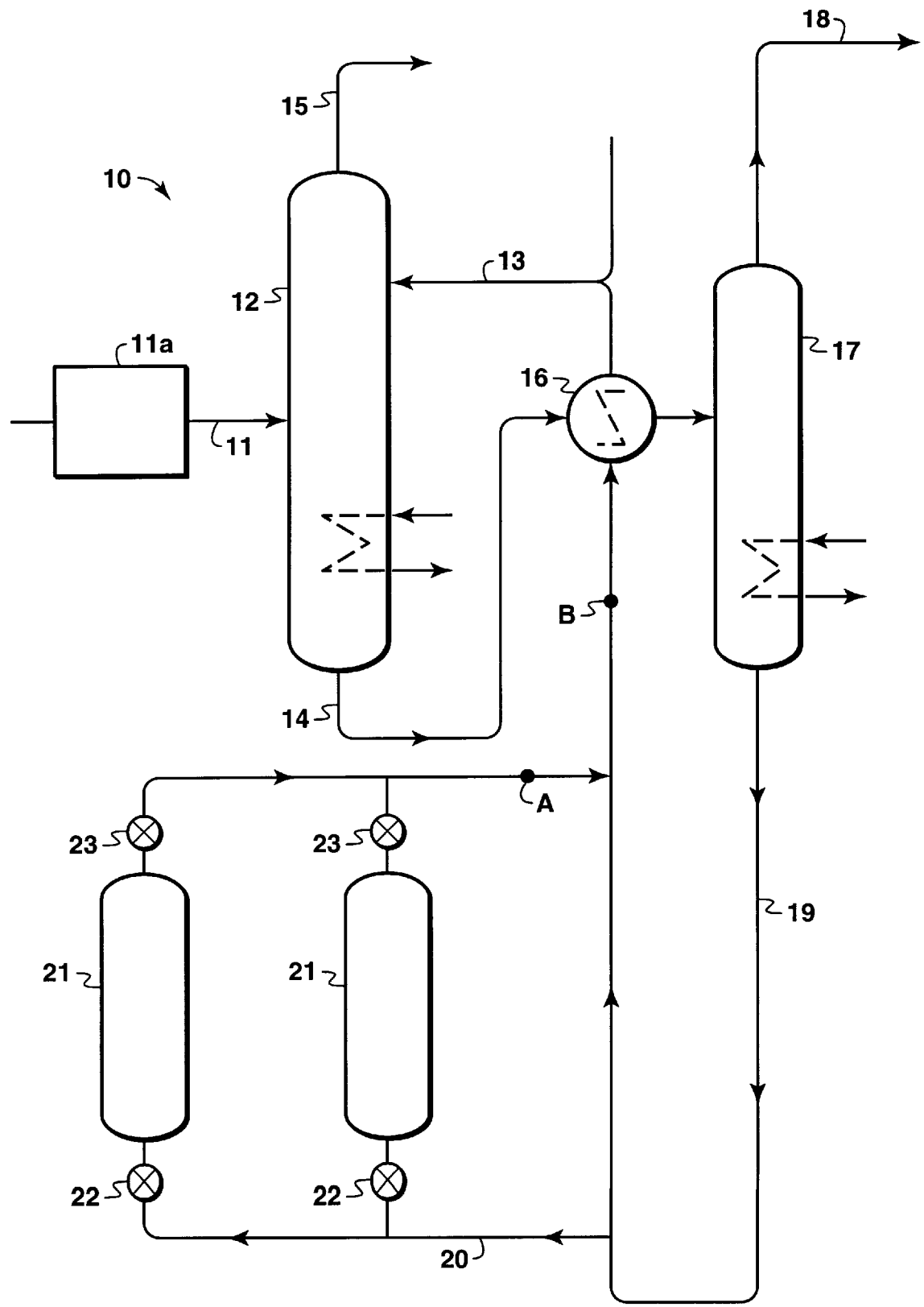
FIG. 1 is a schematical representation of a typical, prior art gas treatment process in which the present invention can be used to measure the efficiency of carbon filters to remove hydrocarbon from a regenerated solvent.

Referring now to the drawings, FIG. 1 schematically illustrates a typical "sour gas" solvent treatment process 10 wherein a stream of sour gas is fed through a line 11 into a high-pressure contactor vessel 12. As will be understood by those skilled in the art, "sour gas" is one that is comprised of a wide range of hydrocarbons (i.e. methane, hexane, dodecane. etc.) which also include a substantial amount of "acid gases" (i.e. hydrogen sulfide ($H_2S$) carbon dioxide ($CO_2$). etc.). The gas stream must be treated to remove or reduce the acid gases to acceptable levels (e.g. from 4–6% $H_2S$ to less than 0.002% and from 3–5% $CO_2$ to less than 3% [Checked with Jags] before the gas can be sent to market. Also, the gas stream can be pretreated (e.g. passing it through a silica gel absorber 11a) before it is fed to contactor vessel 12.

Contactor vessel 12 is typically a bubble-tray tower (e.g. 52 feet high) that has a plurality of horizontal trays (not shown) spaced therein, wherein the incoming stream 11 of sour gas flows upward while a solvent flows into vessel 12 near its top and flows downward. Vessel 12 is normally operated at about 1000 psig and 100° F. The solvent is one which will absorb the acid gases from the hydrocarbon gas stream upon contact and will carry the acid gases out the bottom of vessel 12 through outlet 14. The solvent is preferably an aqueous mixture containing amines (e.g. "Sulfinol-M", commercially available from Shell Oil Company that is comprised of approximately 50% methyldiethanolamine (MDEA), 25% Tetrahydrothiophene-1,1-dioxide (also known as sulfolane or cyclo-tetramethylene sulfone) and 25% water).

The MDEA absorbs H$_2$S and CO$_2$ while the sulfolane absorbs the H$_2$S. The "rich" solvent (i.e. solvent plus absorbed acid gases) is passed through outlet line 14, through to a heat exchanger 16, and into solvent regeneration vessel 17, wherein the operating pressure is reduced to about 15 psig and the temperature is increased to about 250° F. This breaks the weak bond between the solvent and the acid gases so that the acid gases, are readily separated from the solvent. Both the solvent absorption of the acid gases and the regeneration of the solvent as described above are well known in this art.

The separated acid gases then pass from the top of regenerator 17 and through line 18 for further processing and handling; e.g. to a Claus process where sulfur is recovered from the H$_2$S gas, as is also known in the art. The regenerated solvent passes from the bottom of regenerator vessel 17 through line 19, through heat exchanger 16 where it gives up heat to the rich solvent in line 14, and back into contactor vessel 12 through line 13 where it again absorbs acid gases from the sour gas stream and the process is repeated.

Unfortunately, some of the hydrocarbons (e.g. C$_{5+}$) in the sour gas stream also are soluble or dispersed in the regenerated solvent. A small portion of these hydrocarbons are absorbed into the rich solvent and are carried therewith from the contactor 12 but are not readily separated along with the acid gases during regeneration of the solvent. The buildup of these hydrocarbons in the recycled, regenerated solvent will continue until the volume of hydrocarbons in the solvent exceeds an unacceptable level (e.g. 1.5% by volume) whereupon the amines in the solvent emulsify and will begin to "foam", thereby forming bubbles which, in turn, trap acid gas therein.

These bubbles build up on the trays within the contactor 12 until they break, thereby releasing acid gas back into the processed or sales gas stream 15 which is being drawn from the top of contactor 12. When this happens, contactor 12 loses its effectiveness and acid gas (H$_2$S) detectors (not shown) on sales gas line 15 sense the increase in acid gas and may shut the process down, thereby leading to expensive downtime and delay.

It has been found that the hydrocarbon buildup in the regenerated solvent can be controlled by passing a relatively small side or slip stream 20 of the regenerated solvent through a carbon filter(s) 21. For example, a side stream 20 of about 75–80 gallons from a main stream of 350 gallons in line 19 is usually sufficient to control the buildup of hydrocarbons in the regenerated solvent. While only one filter unit 21 can be used, preferably at least two units are connected in parallel so that by properly manipulating inlet valves 22 and outlet valves 23, the side stream can be switched between units when one filter becomes saturated. This allows continuous filtering of the side stream even while the carbon is being changed. Also, in some instances, as pointed out above, the carbon filter(s) 21 are used in conjunction with other known hydrocarbon extraction means (e.g. silica gel absorption beds 11*a*).

The carbon filter 21 substantially reduces the amounts of hydrocarbons in the regenerated solvent thereby controlling the amount of hydrocarbons that return to contactor 12. However, as with all filters, filter(s) 21 eventually becomes saturated to a level where the absorption capacity of the filter is no longer effective to control the hydrocarbon buildup in the solvent. That is, it has been found that when the level of hydrocarbons in the returned regenerated solvent approaches 2% by volume foaming will occur in contactor vessel 12.

Typically in most prior art processes, the saturation of the carbon filter is not closely monitored and is only of concern when the differential pressure across the filter substantially increased; the only known exception being the process disclosed in U.S. Pat. No. 5,683,491, issued to the current assignee on Nov. 4, 1997, and which is incorporated herein by reference. In the other prior art processes, the increased differential pressure across a filter normally indicated that the filter was likely becoming plugged and hence was saturated with hydrocarbons. The carbon was then changed out, but by this time, (1) foaming may have already started to occur in the contactor vessel; (2) excessive acid gases may have started to show up in the sales gas; and/or (3) excessive SO$_2$ may have been detected in the flue stack emissions, any of which would likely require shut down of the gas treatment process. Such shut downs obviously adversely effect the overall economics of the gas treatment process.

As will be recognized by those skilled in this art the basic gas treatment process described to this point is generally well known. In accordance with the present invention, a method is provided wherein the hydrocarbon saturation of carbon filter(s) 21 can be monitored on a routine basis. This allows the carbon filter to be changed before the saturation level of the filter reaches that at which it no longer will sufficiently absorb hydrocarbons from the regenerated solvent to prevent foaming and/or other negative side-effects from occurring in the process.

Basically, a sample point A is provided just downstream of the outlet of the filter(s) 21 from which a sample of the regenerated solvent can be taken after it has passed through filter 21. This sample will indicate the degree of saturation of the filter(s). Also, a second sample point B may be provided in return line 19 downstream of the point where side stream 20 is rejoined with line 19 from which the total hydrocarbon contamination of the recycled solvent can be determined.

A sample from either point A and/or B can be taken on a regular schedule (e.g. daily) and is analyzed via a fast gas chromatograph (GC). The results from the GC are then processed and compared to an internal standard and by previously determined response. When this analysis indicates that the hydrocarbon saturation in a sample taken from either sample point is approaching an unacceptable level (e.g. 1.5% by volume), the carbon in filter(s) 21 is changed and the process is resumed. As shown, flow can easily be switched from the saturated filter 21 to the other filter without stopping the slip stream 20.

More specifically, the gas chromatography method of the present invention differs from known GC methods in that sample preparation is performed within a GC autosampler vial and the analysis is rapid using "fast" gas chromatography with automated data processing. The ease and rapidity permits replicate analyses for improved statistical measurements, and allows the method to be performed by technicians with minimal effort and training.

In carrying out the present method, a series of synthetic mixtures of hydrocarbons in the gas treatment organic solvent is prepared. These synthetic mixtures are used to validate the method and provide basic statistical information such as repeatability, reproducibility, and range. As the method becomes established, one or all of the synthetic hydrocarbon mixtures can be analyzed occasionally to verify continued performance of the method. Ideally, the organic solvent system used in the contactor is prepared as a synthetic blend from reagents known to be free of hydrocarbon contaminants. The reagents are weighed in their correct proportion and mixed. Most of the reagents are liquid and can be transferred easily using disposable pipettes. Amines that are solid at room temperature can be mildly heated to their melting points to ease sample transfer. For example, Sulfinol-D can be prepared as a mixture of 56% tetramethylsulfone (Aldrich T2,220-9); 23.2% diisopropanolamine (Aldrich 13,301-9), 0.80% 2-oxazolidone (Aldrich 0-949-9) and 20% water (deionized). Organic solvents purchased for use in the contactor can be substituted provided prior analysis shows the absence of hydrocarbon contaminants.

A stock solution used for extraction of hydrocarbons from the amine solution was spiked with an internal standard. One gram of trans-2-heptene is dissolved in one Liter of carbon disulfide ($CS_2$). Trans-2-heptene was selected as an internal standard because baseline resolution from all naturally occurring hydrocarbons is easily achieved. $CS_2$ is used since it readily dissolves hydrocarbons and does not yield a significant FID signal. The hazardous nature of $CS_2$ demands that preparation of the internal standard solution and its subsequent use in hydrocarbon extraction should be conducted in a well ventilated area, preferably under a chemical hood.

A standard solution of hydrocarbons is prepared by mixing individual hydrocarbons of known purity at approximately equal weights. The test blend shown in FIG. 2 contains n-hexane (n-$C_6$), benzene, n-heptane (n-$C_7$), toluene, o-xylene, n-$C_{13}$ and n-$C_{14}$. Additional saturated hydrocarbons characteristic of the gas stream may be added for enhanced accuracy. Care should be taken during the preparation of the hydrocarbon standard solution to minimize volatilization of the lightest components. This can be accomplished by minimizing exposure of the mixture to the atmosphere and cooling the mixing vessel (e.g., a dry ice/isopropyl alcohol slurry) during preparation. If the latter is attempted, moisture condensation must be avoided during weighing.

A series of synthetic mixtures of hydrocarbons in the aqueous organic solvent solution are prepared by weight. These synthetic blends should range from ~0.1 to 3 weight percent total hydrocarbons. This spans the range observed in the slip stream from normal background levels( ~0.1%) to beyond the level where the carbon filter(s) is saturated and no longer functioning properly. Five blends of ~0.1, 0.5, 1.0, 1.5, and 3% are sufficient, though additional mixtures of intermediate values would increase precision and accuracy. Hydrocarbons do not dissolve readily in the amine solution and the test blend must be emulsified or finely dispersed. This is most easily accomplished by mechanical agitation under mild heat (~50° C.). Care must be taken to make sure the hydrocarbons have not dropped out of dispersion prior to use and have not evaporated.

In preparing the hydrocarbon-organic solvent blends for analysis, 200 mL of the synthetic blends are pipetted into autosampler vials, weighed, and mixed with 1 mL of $CS_2$ spiked with trans-2-heptene. A digital auto-pipette (e.g. as, a Labsystems Finnpipette Digital 200–1000 ml pipette w/disposable Fisherbrand Redi-Tips (Cat. # 21-197-8a)) is recommended for the liquid transfers to assure reproducibility and ease of use. Ideally, the pipetted sample should be weighed; however, the accuracy of auto-pipettes is sufficient that once a suitable number of weights are recorded, and the average weight and error determined, the average weight can be used as a default with only a small sacrifice in accuracy (<0.5% error). This is particularly useful if the method is to be performed where an analytical balance is not available. The autosampler vial is tightly sealed and vigorously shook or agitated for ~2 to 5 minutes. This will effectively extract the hydrocarbons from the organic solvent solution into the $CS_2$. After extraction, the $CS_2$ (yellowish color) may be dispersed as individual globules within the amine solution. The $CS_2$ globules can be condensed into a bottom layer by lightly tapping the vial. A minimum of three samples of each hydrocarbon blend should be prepared for triplicate analysis.

A Hewlett Packard 6890 fast gas chromatograph (G1530A) is used for the analysis of the extracted hydrocarbon and the amine solutions. The HP 6890 GC is equipped with the following options: Power supply for fast oven ramps, capillary split/splitless injector with EPC (electronic pressure control), flame ionization detector (FID) with EPC, oven exhaust deflector, an autosampler (option G1917A: includes controller, injector, 100 sample tray, cables, and mounting brackets) and a single instrument GC Chemstation (G20770AA software). Any gas chromatograph capable of rapid heating (25° C./minute) and autosampler capable of controlling the injection needle's height of sampling is sufficient for this procedure.

A 5% phenyl methylsilicone 30 m×0.32 mm id×0.25 um film thickness is used in the separation. Although narrow bore columns are recommended for fast GC applications, the use of a standard capillary column is desired to minimize problems associated with high inlet pressures, sample size, and column costs and availability.

Hydrogen from a Whatman gas generator is used as the carrier gas. The gas generator provides pure, hydrocarbon-free hydrogen to supply both carrier and detector gas and is recommended for its safety. Cylinder hydrogen can be substituted provided it is chromatographic grade, in-line filters are present, and appropriate safety procedures are followed. Helium can be substituted as the carrier gas, but with a slight loss of resolution and longer analysis time. In addition to hydrogen, the flame ionization detector (FID) requires chromatographic grade air and helium (make-up gas). High purity cylinder air and helium was used with in-line filters to remove moisture and trace organic contaminants.

The autosampler is programmed to inject 1 mL of the $CS_2$ bottom layer. The Hewlett Packard autosampler is capable of adjusting the position of the needle when taking a sample. Setting the needle position to sample ~1–2 millimeters from the vial's bottom will allow the organic phase to be sampled without removing the overlaying aqueous amine layer. If a different autosampler is used that is not capable of varying the sampling position, the organic $CS_2$ phase should be transferred via a syringe into a new autosampler vial. The autosampler is set for four post-injection solvent rinses (methylene chloride/hexane) and five syringe pumps prior to injection.

The gas chromatograph injector is run in split mode operation and set to 250° C. with an initial head pressure of 8 psi. A split ratio of 35:1 (135 mL/min) is maintained during injection. The gas saver feature reduces split flow to 15 mL/min after 1 minute.

The method is run in constant flow mode (~3.8 mL/min). At the initial temperature of 35° a head pressure of 8 psi is required. The average linear velocity for the chromatographic run is ~64 cm/sec. Outlet pressure is set to ambient.

The oven is initially set to 35° C. Upon injection, it is heated at a 25° C./min ramp rate to 200° C. which completes the analysis in 6.6 minutes. The oven is then reset for the next analysis with an equilibrium hold of 2.0 minutes. The maximum over temperature is set to the column's limit (350° C. or lower). The final temperature of the program can be adjusted upwards to the maximum limit if higher hydrocarbon (>$C_{20}$) are being detected in the process stream.

The flame ionization detector is operated at a temperature of 250° C. If the final temperature is adjusted above 200° C., the FID temperature should be raised proportionally. Gas flows to the FID should be optimized for maximum sensitivity following vendor procedures. A hydrogen flow of 30 mL/min with an air flow of 400 mL/min is typical of ideal conditions. Helium is used as a makeup gas with the combined column+makeup flow set to a constant of 30 mL/min. Since the column flow is constant (3.8 mL/min), the make-up gas flow is also constant at 26.2 mL/min.

Fast-GC requires that digital data be collected rapidly. The signal speed is set to 20 Hz with a minimum peak width of 0.01 min. All data is saved over the length of the analysis (6.6 min.).

The collected digital data is processed so that the peak areas of the detected hydrocarbons are measured. Small amounts of amines that were solubilized by the organic solvent must not be included in the integration. For example, sulfone is slightly soluble in $CS_2$ and is present with the extracted hydrocarbons. DIPA remains totally in the aqueous phase.

Most commercial chromatographic data acquisition software is capable of auto-integrating resolved peaks and calculating hydrocarbon abundances based on an internal standard. Alternatively, the peaks can be manually integrated and the values placed in an electronic spreadsheet (e.g. Microsoft Excel) to calculate the hydrocarbon abundance from peak areas. Statistics are easily performed on data entered into an electronic spreadsheet.

Figure 2:
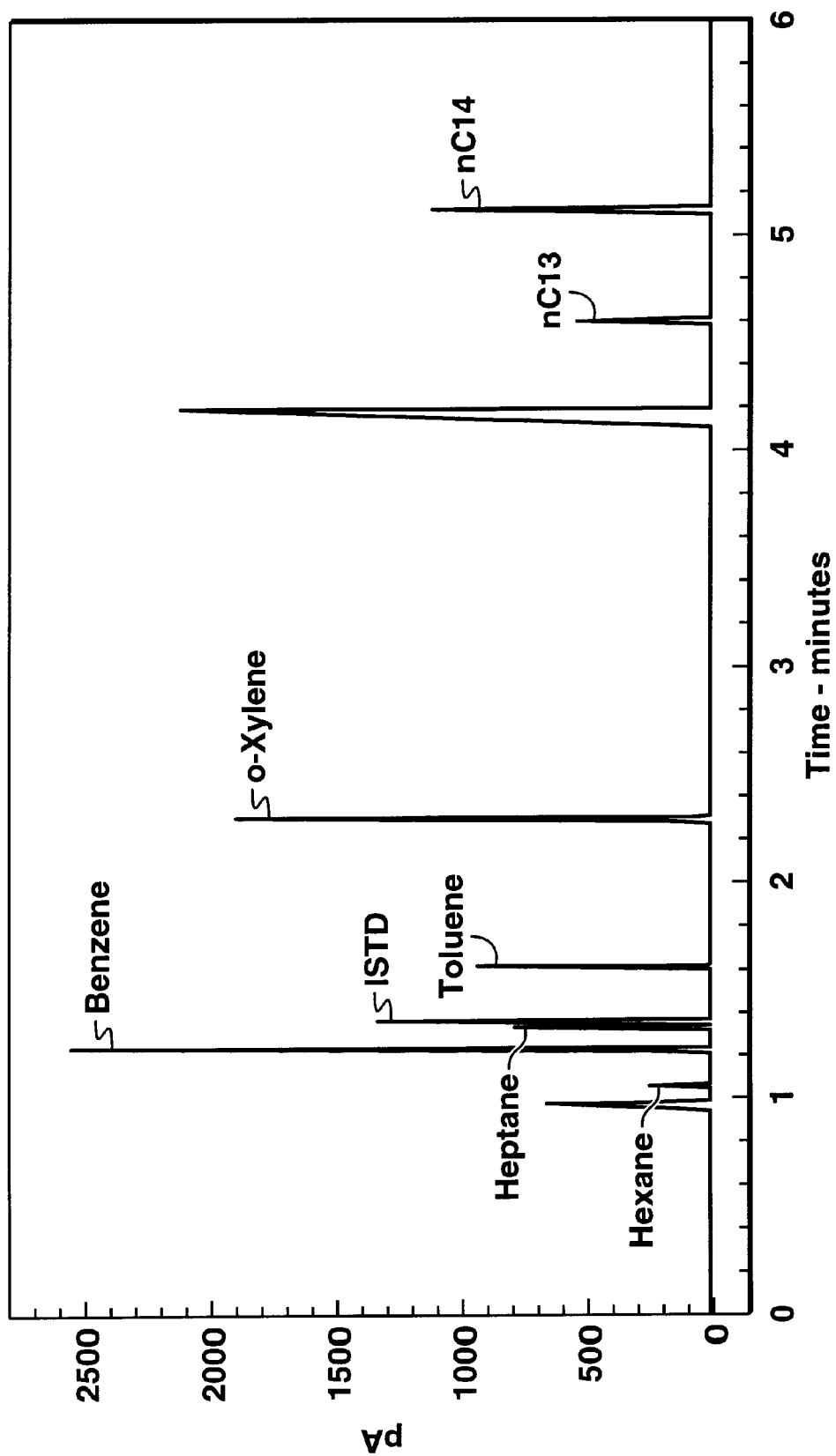
FIG. 2 is a typical gas chromatogram representative of a hydrocarbon test blend extracted from a synthetic mixture of a gas treatment solution.

An example chromatogram of the hydrocarbon extract is shown in FIG. 2. Note that the $CS_2$ solvent peak at ~0.95 min and the tetramethylsulfone peak at ~4.2 min (unlabeled peaks in FIG. 2) are not integrated and their peak area should not be included in calculations of total hydrocarbon content.

The concentration of individual hydrocarbons is determined by relating its peak area to the internal standard's peak area and amount and to the sample weight.

The formula for this calculation is:

$$HC \text{ Concentration} = \frac{HC \text{ Area}}{ISTD \text{ Area}} \times \frac{ISTD \text{ Amount}}{Sample \text{ wt.}} \times (f) \text{ wherein:}$$

HC = individual hydrocarbons, ppms.;

ISTD = amount of internal standard, micrograms;

wt. = weight, grams; and f = unit conversion factor.

The formula is applicable to individual hydrocarbons or to a total hydrocarbon area. Each test blend sample is analyzed in triplicate and the concentration of individual hydrocarbons are calculated using the procedures described above. Results from the triplicate analyses can be subjected to standard t-test to determine if any one analysis is suspect. If the calculated values are not in agreement, the suspect run should be repeated.

Response factors can be determined by comparing the known concentration of each individual hydrocarbon standard with its measured value. In this case, response factors are not merely the variance in detector response to individual compounds, but is a composite reflecting sample preparation, solvent partitioning and detector response. Average response factors, determined for each hydrocarbon using all runs on all test blends, are listed in Table 1.

TABLE 1

Response Factors for Individual Hydrocarbons

| Hydrocarbon | Rf ± std. dev. (n = 15) |
|---|---|
| Hexane | 3.189 ± 0.709 |
| Benzene | 0.903 ± 0.037 |
| Heptane | 2.023 ± 0.501 |
| Toluene | 0.863 ± 0.026 |
| n-$C_{13}$ | 0.823 ± 0.031 |
| n-$C_{14}$ | 1.088 ± 0.163 |

The accuracy of the method to measure total hydrocarbon or total aromatic hydrocarbons (benzene, toluene, xylene ("BTX") which, in turn, is approximately one-half of the total hydrocarbons) is shown in Table 2. Hydrocarbon concentrations in this table were obtained by using response factors for individual hydrocarbons instead of assuming the hydrocarbon response factor was equal to the internal standard response factor. If a high degree of accuracy is required, as it usually is in a BTX analysis, response factors should be determined for each hydrocarbon that is present in the process stream. A test blend should be prepared with all major hydrocarbon components. Response factors could be extrapolated for minor hydrocarbons with little effort on the overall accuracy of the method.

TABLE 2

Comparison of measured and Actual Total Hydrocarbon Content in Synthetic Test Blends

| Test Blend | Measured Total HC | Actual Total HC | Measured BTX | Actual BTX |
|---|---|---|---|---|
| 1 | 0.10% ± 0.01 | 0.08% | 0.04% ± 0.01 | 0.04% |
| 2 | 0.46% ± 0.05 | 0.45% | 0.24% ± 0.01 | 0.24% |
| 3 | 1.01% ± 0.11 | 1.07% | 0.55% ± 0.02 | 0.56% |
| 4 | 1.38% ± 0.15 | 1.51% | 0.76% ± 0.03 | 0.79% |
| 5 | 3.00% ± 0.31 | 3.06% | 1.68% ± 0.06 | 1.61% |

Application of the method to determining the hydrocarbon concentration in a regenerated organic solvent follows the same procedure described for the synthetic hydrocarbon blends. The carbon filter(s) can be monitored at any time during the gas treatment process by taking a sample from point A, or the total contamination of the recycled solvent can be monitored by taking a sample from point B. The samples are prepared by performing a liquid-liquid extraction in a GC autosampler vial, and analyzing the resulting extract with a GC. The concentration of individual or total hydrocarbons can be determined by comparing peak areas to that of the internal standard (trans-2-heptene) and application of predetermined response factors.

What is claimed is:

1. A method for treating a sour hydrocarbon gas stream, said method comprising:

contacting said sour hydrocarbon gas with a solvent to remove acid gases from said sour gas stream;

regenerating said solvent by removing said acid gases from said solvent to form a regenerated solvent;

passing at least a portion of said regenerated solvent through a carbon filter to remove hydrocarbons from said regenerated solvent and form a filtered, regenerated solvent, said hydrocarbons having been absorbed from said sour gas stream along with said acid gases;

recycling said filtered, regenerated solvent for use in further removing acid gases from said sour gas stream; and determining the absorption efficiency of said carbon filter for removing said hydrocarbons from said regenerated solvent, said step of determining said absorption efficiency comprising:

taking a first sample from said filtered, regenerated solvent after it has passed through said carbon filter;

mixing a solution comprised of an internal standard and carbon disulfide into said first sample to thereby dissolve and concentrate said hydrocarbons from said first sample into said solution;

withdrawing a second sample from said solution having the dissolved hydrocarbons therein;

passing said second sample through a gas chromatograph to measure the relative area counts of both the known hydrocarbons and the internal standard in said filtered, regenerated solvent; and determining the concentration of said hydrocarbons in said second sample from the measured area counts of said relative hydrocarbons and said internal standard.

2. The method of claim 1 wherein said concentration of said hydrocarbons in said second sample is determined in accordance with the following relationship:

$$HC \text{ Concentration} = \frac{HC \text{ Area}}{ISTD \text{ Area}} \times \frac{ISTD \text{ Amount}}{\text{Sample wt.}} \times (f) \text{ wherein:}$$

$HC$ = hydrocarbons, ppms $ISTD$ = internal standard, micrograms;

wt. = weight, grams and $f$ = unit conversion factor.

3. The method of claim 1 wherein said internal standard comprises:

trans-2-heptene.

4. The method of claim 1 wherein said solution comprises:

1 gram trans-2-heptene per 1 Liter carbon disulfide.

5. The method of claim 1 wherein said first sample is agitated after said solution has been mixed therewith and before said second sample is withdrawn therefrom.

6. The method of claim 1 wherein said second sample is withdrawn from said first sample by a needle of an autosampler which is positioned within said solution having said hydrocarbons dissolved therein.

7. The method of claim 1 wherein said gas chromatograph includes a fast temperature ramp.

8. In a method for treating a hydrocarbon gas stream by (a) removing acid gases from said gas stream by contacting said stream with a solvent; (b) regenerating said solvent by removing said acid gases from said solvent to form regenerated solvent; (c) passing at least a portion of said regenerated solvent through a carbon filter to remove hydrocarbons from said solvent and form filtered, regenerated solvent; and (d) recycling said filtered, regenerated solvent for use in removing said acid gases from said hydrocarbon stream; the improvement comprising:

a method for determining the efficiency of said carbon filter for absorbing said hydrocarbons from said regenerated solvent; said method comprising:

taking a first sample from said filtered, regenerated solvent after it has passed through said carbon filter;

mixing a solution comprised of an internal standard and carbon disulfide into said first sample to thereby dissolve and concentrate said hydrocarbons from said first sample into said solution;

withdrawing a second sample from said solution having the dissolved hydrocarbons therein;

passing said second sample through a gas chromatograph to measure the relative area counts of both the known hydrocarbons and the internal standard in said filtered, regenerated solvent; and determining the concentration of said hydrocarbons in said second sample from the measured area counts of said relative hydrocarbons and said internal standard.

9. The method of claim 8 wherein said concentration of said hydrocarbons in said second sample is determined in accordance with the following relationship:

$$HC \text{ Concentration} = \frac{HC \text{ Area}}{ISTD \text{ Area}} \times \frac{ISTD \text{ Amount}}{\text{Sample wt.}} \times (f) \text{ wherein:}$$

$HC$ = hydrocarbons, ppms $ISTD$ = internal standard, micrograms;

wt. = weight, grams and $f$ = unit conversion factor.

10. The method of claim 8 wherein said internal standard comprises:

trans-2-heptene.

11. The method of claim 8 wherein said solution comprises:

1 gram trans-2-heptene per 1 Liter carbon disulfide.

12. The method of claim 8 wherein said first sample is agitated after said solution has been mixed therewith and before said second sample is withdrawn therefrom.

13. The method of claim 8 wherein said second sample is withdrawn from said first sample by a needle of an autosampler which is positioned within said solution having said hydrocarbons dissolved therein.

14. The method of claim 8 wherein said gas chromatograph includes a fast temperature ramp.

* * * * *